United States Patent
Relyea et al.

(10) Patent No.: US 8,316,408 B2
(45) Date of Patent: Nov. 20, 2012

(54) AUDIO PROCESSING FOR MEDIA CONTENT ACCESS SYSTEMS AND METHODS

(75) Inventors: Don Relyea, Dallas, TX (US); Heath Stallings, Grapevine, TX (US); Brian Roberts, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 300 days.

(21) Appl. No.: 11/603,461

(22) Filed: Nov. 22, 2006

(65) Prior Publication Data
US 2008/0120665 A1    May 22, 2008

(51) Int. Cl.
*H04N 7/173* (2006.01)
(52) U.S. Cl. .......................... 725/131; 725/110; 725/139
(58) Field of Classification Search ........... 725/106–107
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,690,321 A * | 11/1997 | Seni et al. ............... 267/140.14 |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,872,852 A * | 2/1999 | Dougherty ...................... 381/57 |
| 5,886,746 A | 3/1999 | Yuen et al. |
| 5,915,026 A | 6/1999 | Mankovitz |

(Continued)

*Primary Examiner* — Brian Pendleton
*Assistant Examiner* — Cai Chen

(57) ABSTRACT

In one of many possible embodiments, a system includes a media content provider subsystem providing media content over a closed media network and a closed media network access device communicatively coupled to the media content provider subsystem by the closed media network. The closed media network access device is configured to receive the media content over the closed media network, provide at least a component of the media content to an output device for presentation to a user, receive audio input including user voice input provided by the user, and utilize the user voice input in at least one of a voice command application and a communication application.

27 Claims, 12 Drawing Sheets

U.S. PATENT DOCUMENTS

| | | |
|---|---|---|
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,970,098 B1 * | 11/2005 | Adams et al. ............... 340/12.3 |
| 7,039,935 B2 | 5/2006 | Knudson et al. |
| 7,069,576 B1 | 6/2006 | Knudson et al. |
| 7,487,529 B1 | 2/2009 | Orlick |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2002/0149705 A1 * | 10/2002 | Allen et al. ................... 348/734 |
| 2003/0005445 A1 | 1/2003 | Schein et al. |
| 2003/0005462 A1 * | 1/2003 | Broadus et al. .............. 725/110 |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0149988 A1 * | 8/2003 | Ellis et al. ..................... 725/87 |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0117843 A1 * | 6/2004 | Karaoguz et al. ............ 725/108 |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2004/0264705 A1 * | 12/2004 | Hiipakka .................... 381/71.1 |
| 2005/0010949 A1 | 1/2005 | Ward et al. |
| 2005/0028201 A1 | 2/2005 | Klosterman et al. |
| 2005/0063552 A1 * | 3/2005 | Shuttleworth et al. .......... 381/57 |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0107281 A1 * | 5/2006 | Dunton ......................... 725/11 |
| 2006/0156336 A1 | 7/2006 | Knudson et al. |
| 2006/0212894 A1 | 9/2006 | Knudson et al. |
| 2006/0218610 A1 * | 9/2006 | Jansen et al. .................. 725/105 |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0124781 A1 * | 5/2007 | Casey et al. .................... 725/94 |

* cited by examiner

US 8,316,408 B2

AUDIO PROCESSING FOR MEDIA CONTENT ACCESS SYSTEMS AND METHODS

BACKGROUND INFORMATION

The advent of computers, interactive electronic communication, the Internet, and other advances in the digital realm of consumer electronics have resulted in a great variety of programming, recording, and viewing options for users who view media content such as television programs. In implementing such enhanced programming, the set-top box ("STB") has become an important computing device for accessing media content services and the media content within those services. In addition to supporting traditional analog broadcast video functionality, STBs also support an increasing number of two-way digital services such as video-on-demand, Internet protocol television ("IPTV"), and personal video recording.

An STB is typically connected to a cable or satellite, or generally, a subscriber television system, and includes hardware and software necessary to provide the functionality of the subscriber television system at a user site. While many STBs are stand-alone devices that are externally connected to a television, an STB and/or its functionality may be integrated into other devices such as a television.

An STB is usually configured to provide users with a large number and variety of media content choices. For example, a user may choose to view a variety of television programs, pay-per-view services, video-on-demand programming, Internet services, and audio programming via an STB.

An STB also typically provides users with functionality for controlling various settings and operations of the STB. These control functions are often accessible through a user input device such as a remote control device. However, a conventional user input device may not provide acceptable control and input options for all potential users of an STB. Users who are visually impaired or users in low light conditions, for example, may experience difficulty operating a traditional user input device. In addition, user input devices may be easily misplaced or damaged and are not operative when the power source, such as a battery, is exhausted. When a user input device is unavailable or inoperable, a user may be limited in his ability to control and operate a conventional STB. Moreover, certain users may prefer to control an STB in a more natural and convenient manner than that provided by a conventional user input device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF EXEMPLARY EMBODIMENTS

I. Introduction

Figure 1:
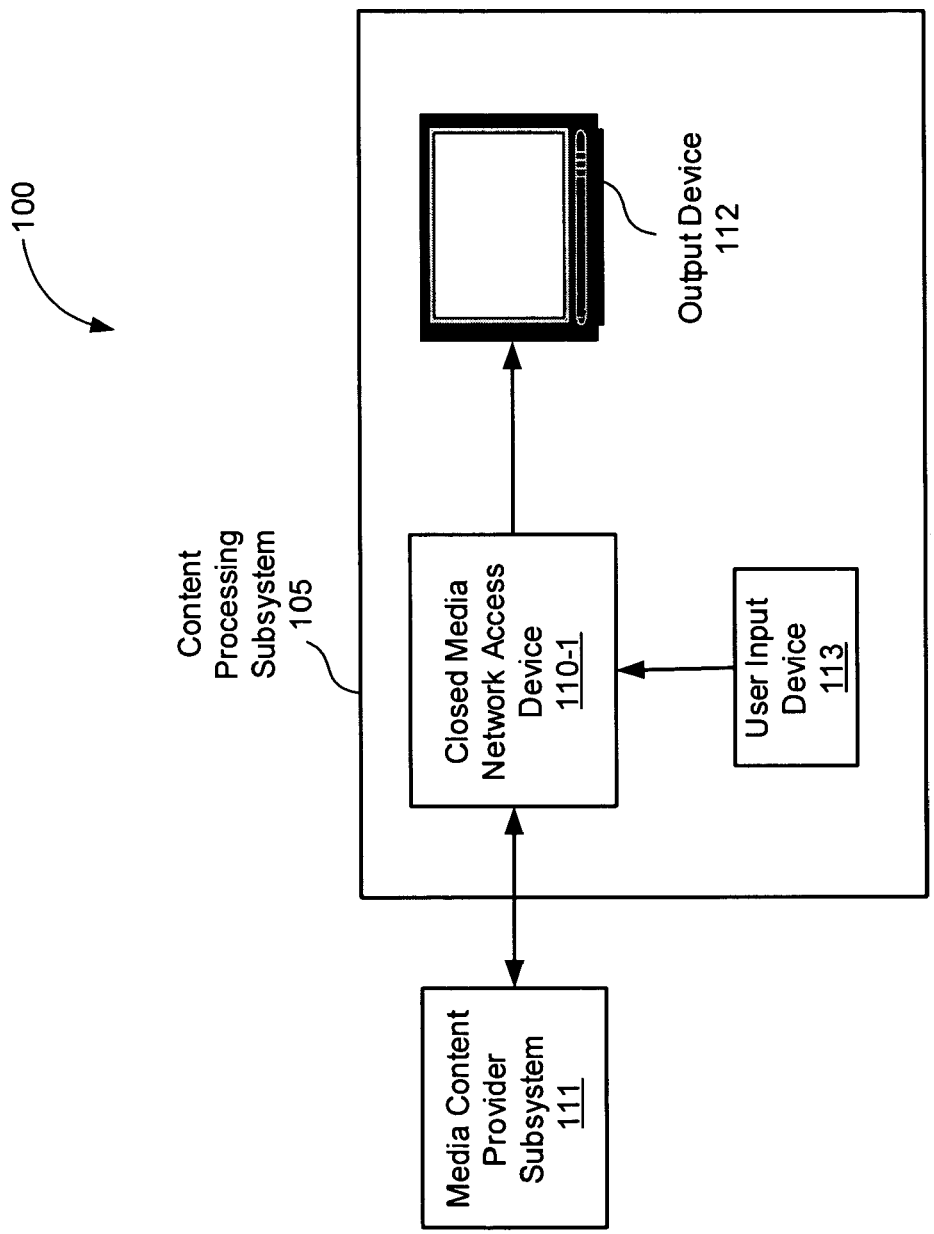
FIG. 1 illustrates an example of a media content access system.

Exemplary systems and methods for processing audio in media content access systems are described herein. In the exemplary systems and methods described herein, a media content instance, or at least a component of the media content instance, may be provided for presentation to a user. As used herein, the term "media content instance" will be used to refer generally to any television program, on-demand program, pay-per-view program, broadcast media program, video-on demand program, commercial, advertisement, video, multimedia, movie, song, photograph, audio programming, network services (e.g., Internet services), gaming program (e.g., a video game) or any segment, portion, component, or combination of these or other forms of media content that may be presented to and experienced (e.g., viewed) by a user. A media content instance may have one or more components. For example, an exemplary media content instance may include a video component and an audio component.

In the exemplary systems and methods described herein, a closed media network access device such as a set-top box ("STB") may be configured to receive and process audio input. The audio input may be provided by a user of the closed media network access device and may include user voice (e.g., speech) input. The closed media network access device may be configured to utilize the user voice input for a variety of applications, including, but not limited to, speech recognition, communication, and voice command applications.

For example, exemplary implementations of the systems and methods described herein may generally enable a user of an STB to conveniently control the STB using voice commands. For instance, a user may vocalize a command that may be received, recognized, and executed by the STB. This functionality provides users with a natural, intuitive, and convenient way to control the operations of the STB, including the presentation of media content. The control of an STB with voice commands can be especially beneficial for visually impaired users or for users wishing to operate the STB in a dimly lit environment. Moreover, reliance upon a user input device such as a remote control device can be generally decreased by providing users with a capability to control an STB using voice commands.

By way of another example, exemplary implementations of the systems and methods described herein may generally enable a user of an STB to communicate with users of remotely located devices (e.g., another STB associated with another user) that are connected to a common communication network. For instance, a user may utilize the STB to participate in a voice or video conference, where the STB is able to provide output audio to the user and receive audio input from the user. This functionality provides users with a convenient way to remotely communicate with others, even while experiencing media content.

In some examples, an STB may be configured to concurrently provide audio output (e.g., an audio component of a media content instance or voice communication) for experiencing by a user and receive audio input from the user. The received audio input may be processed, including filtering noise from the audio input. The filtering may include estimating and removing the broadcast audio from the audio input received by the STB. By removing the estimated broadcast audio from the audio input, the STB is able to more accurately receive and utilize user voice input while also providing audio output such as an audio component of media content or voice communications for experiencing by the user, without the audio output interfering with the user audio input. This can generally increase the accuracy, effectiveness, or versatility of applications configured to process audio input.

Components and functions of exemplary media content access systems and methods will now be described in more detail.

II. Exemplary System View

FIG. 1 illustrates an example of a media content access system 100. Media content access system 100 may take many different forms and include multiple and/or alternate components and facilities.

As shown in FIG. 1, media content access system 100 may include a content processing subsystem 105 having a closed media network access device 110-1, output device 112, and user input device 113. The closed media network access device 110-1 may be configured to communicate with and receive a data stream (i.e., a media content stream) containing media content from a media content provider subsystem 111. The closed media network access device 110-1 and media content provider subsystem 111 may communicate using any known communication technologies, devices, media, and protocols supportive of remote data communications, including, but not limited to, closed media networks, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), Session Initiation Protocol ("SIP"), socket connections, Ethernet, and other suitable communications networks and technologies. In certain exemplary embodiments, the closed media network access device 110-1 and media content provider subsystem 111 are configured to communicate via a broadband network capable of delivering different services (e.g., media content services, Internet access services, and voice communication services) to the closed media network access device 110-1.

The closed media network access device 110-1 may be configured to process the data stream provided by the media content provider subsystem 111 and provide a signal to an output device 112 such that the output device 112 may present media content included in the data stream. In this manner, the closed media network access device 110-1 may cause media content to be presented for experiencing by a user of the closed media network access device 110-1. The presentation of the media content may include, but is not limited to, displaying, playing back, broadcasting, or otherwise providing a media content instance, or one or more components (e.g., video and audio components) of the media content instance.

The closed media network access device 110-1 may receive input from a user input device 113. Through the user input device 113, for example, a user of the closed media network access device 110-1 may control the settings and/or operations of the closed media network access device 110-1, including the presentation of media content.

As will be described in more detail below, the content processing subsystem 105 may be configured to receive and process audio input, including user voice input. For example, the closed media network access device 110-1 and/or the user input device 113 may be configured to receive, filter, and utilize audio input. The audio input may be used for controlling the settings and/or operations of the closed media network access device 110-1 and/or for remote communications over a network.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider Subsystem

Media content provider subsystem 111 may be configured to provide various types of media content including, but not limited to, any of the forms of media content instances described above. The media content may be provided using any suitable communication technologies, including any of those mentioned above.

The media content provider subsystem 111 may be associated with (e.g., operated by) a media content provider. The media content provider may provide media content to a closed media network access device 110-1 associated with a user (e.g., a subscriber to services and/or content provided by the media content provider).

Figure 2:
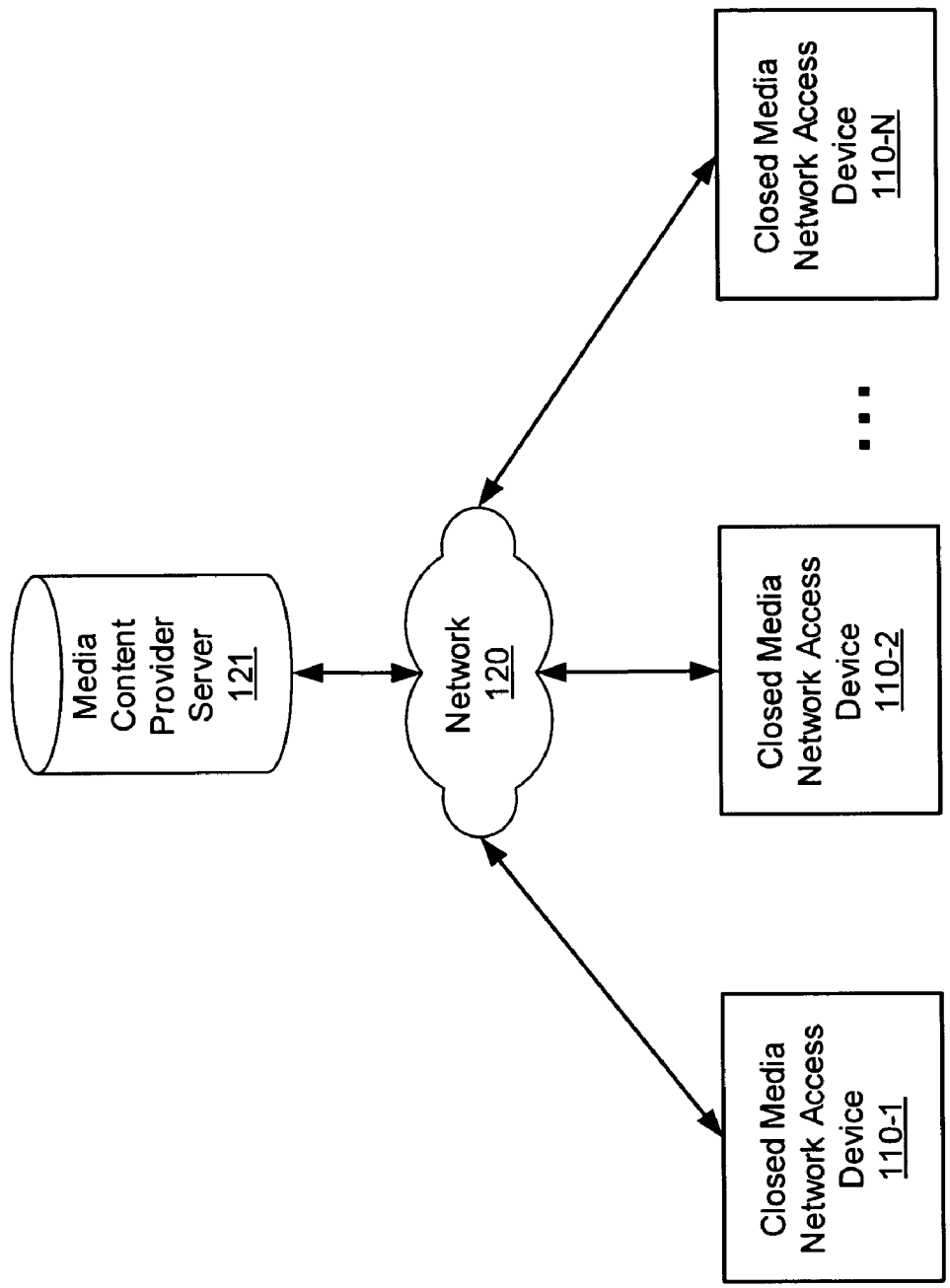
FIG. 2 is an illustration of an exemplary media content provider network.

An exemplary media content provider subsystem 111 may include a media content provider server 121 such as that shown in FIG. 2. The media content provider server 121 may be configured to communicate with the closed media network access device 110-1, as well as other closed media network access devices 110-2 through 110-N, via a network 120 (and communications links thereto). In certain embodiments, network 120 may include any closed media network configured to provide media content to authenticated user devices (e.g., closed media network access devices 110-1 through 110-N). In certain embodiments, the network 120 is closed at least because a content provider controls the media content made available over the network 120.

In certain embodiments, the network 120 includes a subscriber television network such as a cable television network, satellite television network, optical fiber television network, a provider-specific television network (e.g., a Verizon® FIOS® network and/or a TiVo® network), or any combination thereof. In other embodiments, the network 120 may include different closed networks providing subscribers with access to other types of media content, including a satellite media broadcasting network or terrestrial media broadcasting network (e.g., satellite radio), for example. In certain embodiments, the media content provider subsystem 111 provides media content to subscribers who pay a premium for service (e.g., a subscription).

In certain embodiments, the network 120 may include, in addition to a closed media network, one or more other networks, including the Internet, an intranet or other private packet-switched network, a telephone network, a communication network (e.g., a Voice over Internet Protocol (VoIP) or other voice communication network), a broadband network, or any combination of these networks. While FIG. 2 shows a single media content provider server 121, in other examples, the media content provider subsystem 111 may include multiple media content servers.

As described further below, data representative of communications between various ones of the closed media network access devices 110 may be carried over the network 120. Exemplary communications include, but are not limited to, voice and videoconferencing communications.

B. Output Device

As mentioned, the closed media network access device 110-1 may be coupled to an output device 112 configured to present media content for experiencing by a user. The output device 112 may include one or more devices or components configured to present media or other types of content to the user, including a display (e.g., a display screen, television screen, computer monitor, handheld device screen, or any other device configured to display the media content) such as display 122 shown in FIG. 3, an audio output device such as speaker 123 shown in FIG. 3, a television, and any other device configured to present media content. The output device 112 may receive and process output signals from the closed media network access device 110-1 such that content of the output signals is presented for experiencing by the user.

The output device 112 may be configured to modify audio content included in an audio output signal received from the closed media network access device 110-1. For example, the output device 112 may amplify or attenuate the audio content for presentation. By way of another example, the output device 112 may modify certain audio frequencies one way (e.g., amplify) and modify other audio frequencies in another way (e.g., attenuate or filter out). The output device 112 may be configured to modify the audio content for presentation in accordance with one or more equalization settings, which may be set by a user of the output device 112.

While FIG. 1 illustrates the output device 112 as being a device separate from and communicatively coupled to the closed media network access device 110-1, this is exemplary only and not limiting. In other embodiments, the output device 112 and the closed media network access device 110-1 may be integrated into one physical device. For example, the output device 112 may include a display and/or speaker integrated in the closed media network access device 110-1.

C. Closed Media Network Access Device

Figure 3:
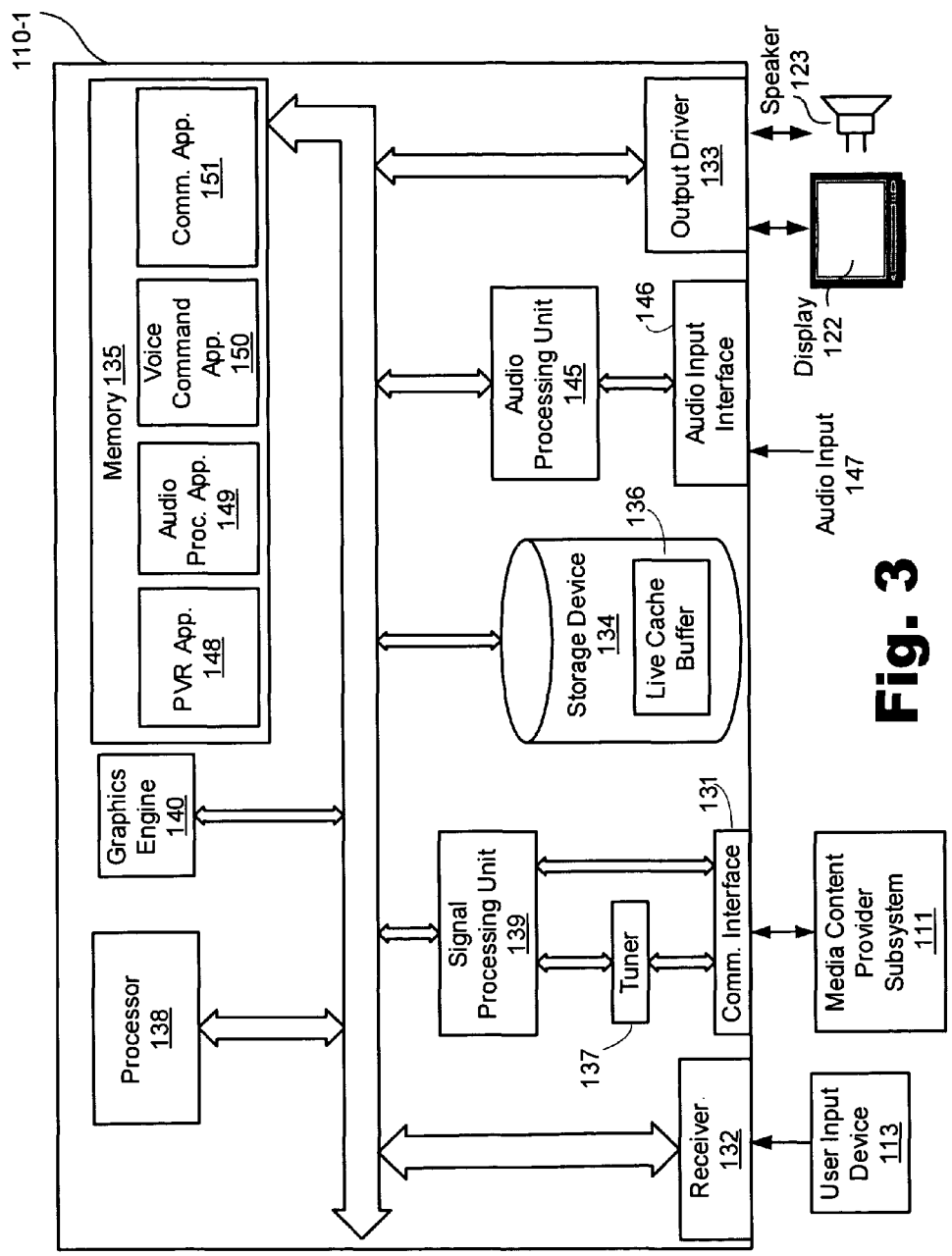
FIG. 3 is a block diagram of an exemplary closed media network access device.

FIG. 3 is a block diagram of an exemplary closed media network access device 110-1 (or simply "access device 110-1"). The access device 110-1 may include any combination of hardware, software, and firmware configured to process an incoming media content stream. The access device 110-1 may include any device or devices configured to receive a data stream from the media content provider subsystem 111, provide media content included in the data stream to an output device 112 for presentation to a user, receive audio input including user voice input provided by the user, and process the audio input for use with one or more applications. An exemplary access device 110-1 may include, but is not limited to, an audio-input enabled set-top box ("STB"), home communication terminal ("HCT"), digital home communication terminal ("DHCT"), stand-alone personal video recorder ("PVR"), and digital video disc ("DVD") player.

In certain embodiments, the access device 110-1 may include any computer hardware and/or instructions (e.g., software programs), or combinations of software and hardware, configured to perform the processes described herein. In particular, it should be understood that access device 110-1 may be implemented on one physical computing device or may be implemented on more than one physical computing device. Accordingly, access device 110-1 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory (DRAM), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary access device 110-1 is shown in FIG. 3, the exemplary components illustrated in FIG. 3 are not intended to be limiting. Indeed, additional or alternative components and/or implementations may be used. Various components of the access device 110-1 will now be described in additional detail.

1. Communication Interfaces

As shown in FIG. 3, the access device 110-1 may include a communication interface 131 configured to receive media content from the media content provider subsystem 111. The communication interface 131 may be further configured to send and receive communication signals carrying communication content. As described below, the communication signals may carry data representative of communications between the access device 110-1 and remote devices (e.g., access devices 110-2 through 110-N) connected to network 120.

The communication interface 131 may include any device, logic, and other technologies suitable for receiving signals and/or data representative of media and/or communication content. In certain embodiments, the communication interface 131 may include a single port configured to receive content from both the media content provider subsystem 111 and the other closed media network access devices 110-2 through 110-N. For example, the communication interface 131 may include or be connected to a broadband connection, which can enable access device 110-1 to receive content on a single port from both the media content provider subsystem 111 and other access devices 110-2 through 110-N. In other embodiments, multiple ports may be used. The communication interface 131 can be configured to interface with any suitable communication media, protocols, and formats, including any of those mentioned above.

The access device 110-1 may also include a receiver 132 configured to receive input commands from the user input device 113. The user input device 113 may include, for example, a remote control or any other suitable device and may be configured to communicate with the receiver 132 via an IR link, electrical connection, or any other suitable communication link. In certain embodiments, the user input device 113 and the receiver 132 may be configured to communicate over a communication link capable of propagating signals carrying data representative of audio input.

Figure 4:
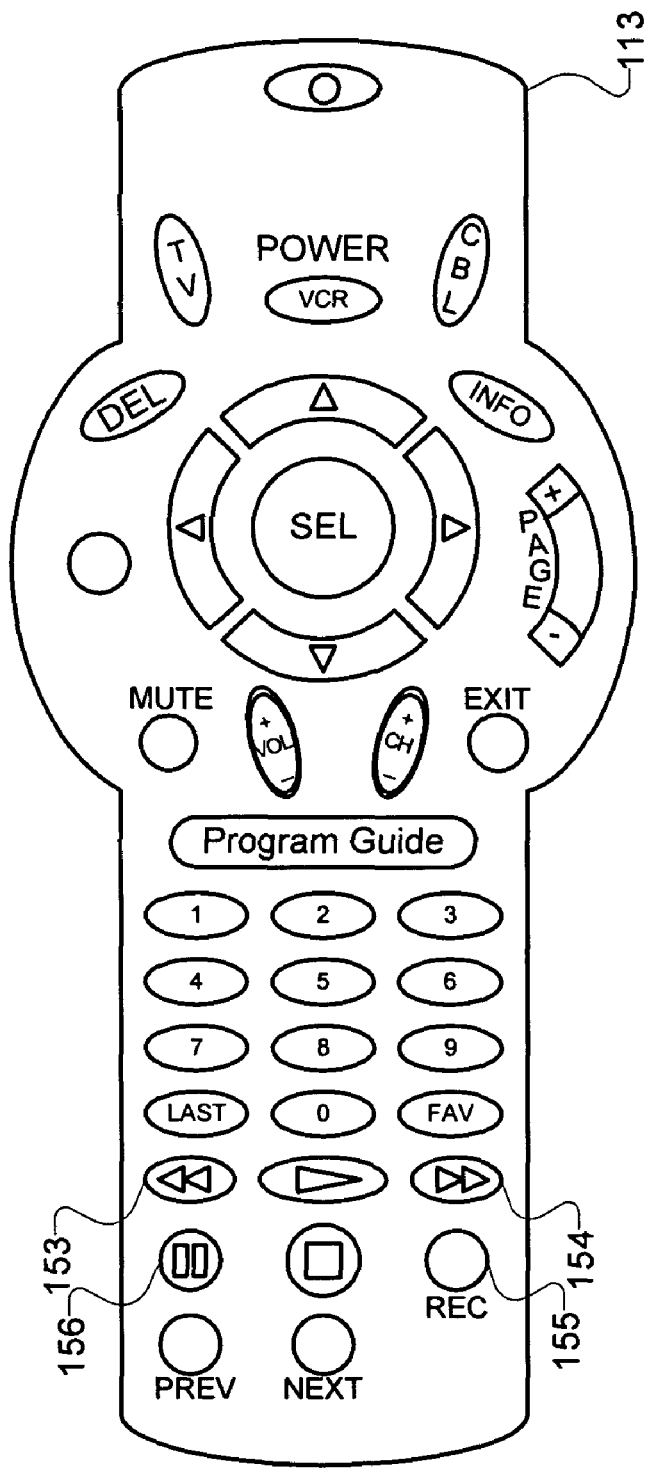
FIG. 4 illustrates an exemplary remote control user device.

An exemplary remote control user input device 113 is illustrated in FIG. 4. In some examples, the user input device 113 may be configured to enable a user to provide various commands and other input signals for controlling settings and operations of the access device 110-1, including commands related to the viewing of the media content. For example, rewind 153 and fast-forward buttons 154 enable a user to access different scenes or frames within media content stored in a live cache buffer 136 (described below in relation to FIG. 3). A record button 155 may also be included which enables the user to designate as permanently recorded any media content instance buffered in the live cache buffer 136. A pause button 156 may enable the user to pause a media content instance. The user input device 113 shown in FIG. 4 is merely illustrative of the many different types of user input devices 113 that may be used in connection with the present systems and methods.

As described further below, the user input device 113 may be configured with hardware, software, and/or firmware for receiving and forwarding audio input (e.g., user speech) to the access device 110-1. In some examples, the user input device 113 may also be configured to perform processing functions on the audio input.

Returning to FIG. 3, the access device 110-1 may also include an output driver 133 configured to interface with or drive the display 122, speaker 123, or other output device. For example, the output driver 133 may provide audio output to a speaker 123 for broadcast to a user. The output driver 133 may include any combination of hardware, software, and firmware as may serve a particular application.

The access device 110-1 may also include an audio input interface 146 for receiving audio input 147. The audio input interface 146 may include hardware, software, and/or firmware for capturing or otherwise receiving sound, including capturing sound waves. For example, the audio input interface 146 may include a microphone and an analog to digital converter ("ADC") configured to capture and convert audio input 147 to a useful format.

In alternative embodiments, an audio input interface 146 may be integrated into the user input device 113 such that the user input device 113 may capture audio input 147, process (e.g., convert to digital form), and then transmit data representative of the audio input 147 to the receiver 132 of the access device 110-1. For example, the user input device 113 may be configured to include a microphone and an ADC for capturing and converting audio input. As mentioned above, any suitable communication signals capable of carrying data representative of audio input may be used for communications between the user input device 113 and the access device 110-1.

Whether the access device 110-1 receives audio input 147 directly or from the user input device 113, the access device 110-1 may be configured to process the audio input 147, including, for example, identifying user voice input included in the audio input 147 and using the user voice input in an application such as a voice command or communication application. Exemplary processing of the audio input 147 by the access device 110-1 will be described further below.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various components or portions of media content may be temporarily and/or permanently stored in the storage device 134.

The storage device 134 of FIG. 3 is shown to be a part of the access device 110-1 for illustrative purposes only. It will be understood that the storage device 134 may additionally or alternatively be located external to the access device 110-1.

The access device 110-1 may also include memory 135. Memory 135 may include, but is not limited to, FLASH memory, random access memory ("RAM"), dynamic RAM ("DRAM"), or a combination thereof. In some examples, as will be described in more detail below, various applications (e.g., a PVR application) used by the access device 110-1 may reside in memory 135.

As shown in FIG. 3, the storage device 134 may include one or more live cache buffers 136. The live cache buffer 136 may additionally or alternatively reside in memory 135 or in a storage device external to the access device 110-1.

As will be described in more detail below, data representative of or associated with media content (or other types of content) or the presentation of media content may be stored in the storage device 134, memory 135, or live cache buffer 136. For example, data representative of an output audio signal provided to the output device 112 by the access device 110-1 may be stored or otherwise tracked by the access device 110-1. The stored data can be used for processing (e.g., filtering) audio input 147 received by the access device 110-1, as described below.

3. Tuner

Tuner 137 is configured to selectively receive content (e.g., media content) carried on a particular media (e.g., television) channel, stream, address, frequency or other carrier. For example, tuner 137 may be tuned to a particular media channel such that the content carried on the media channel is received and can be processed by the access device 110-1.

In some examples, the access device 110-1 may include multiple tuners 137 such that content carried on different media channels may be concurrently received by the access device 110-1. For example, the access device 110-1 may include a first tuner configured to receive content carried on an analog video signal and a second tuner configured to simultaneously receive content carried on a digital compressed signal.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

While tuner 137 may be used to receive various types of media-content-carrying signals broadcast by content delivery subsystem 111, closed media network access device 110-1 may be configured to receive other types of content signals (including media content signals and communication signals) from the media content provider subsystem 111 or other source (e.g., access device 110-2) without using a tuner. For example, media content provider subsystem 111 may broadcast digital streams of data packets (e.g., Internet Protocol ("IP") based data packets such as those used for IPTV) that can be received without using a tuner. For such types of content signals, the communication interface 131 may receive and forward the signals directly to signal processing unit 139 without going through the tuner 137. For an IP-based signal, for example, the signal processing unit 139 may function as an IP receiver.

4. Processors

As shown in FIG. 3, the access device 110-1 may include one or more processors, such as processor 138 configured to control the operations of the access device 110-1. The access device 110-1 may also include a signal processing unit 139 configured to process incoming media content. The signal processing unit 139 may be configured, for example, to demodulate, decode, and parse encoded digital media content. In some examples, the access device 110-1 may include one or more signal processing units 139 corresponding to each of the tuners 137.

As shown in FIG. 3, the access device 110-1 may also include a graphics engine 140 configured to generate graphics that are to be displayed by the output device 112. The graphics may include, but are not limited to, views of media content instances (e.g., "on-video" screen views), components of media content instances, program guides, progress bars, calibration interfaces, control menus and interfaces, communication application interfaces, and other graphics.

The access device 110-1 may also include an audio processing unit 145 configured to process audio data. The audio processing unit 145 may be configured to process audio data in digital and/or analog form. The audio processing unit 145 may process an audio component of a media content instance or communication signal, including providing the audio component to the output device 112 for broadcast to a user. The audio component may be provided to the output device 112 via the output driver 133.

The audio processing unit 145 may be further configured to process audio input 147 received by the audio input interface 146, including filtering the audio input 147. Filtration of the audio input 147 allows the access device 110-1 to receive and accurately utilize user voice input even while providing media and/or communications audio content for presentation to a user, without the audio output interfering with the receipt and use of the user voice input.

The audio processing unit 145 and/or other components of the access device 110-1 may be configured to perform any of the audio processing functions described herein and/or any of the audio processing (e.g., filtering) functions described in co-pending U.S. patent application No. 11/603,460, entitled "Audio Filtration For Content Processing Systems and Methods," filed the same day as the present application and hereby fully incorporated herein by reference in its entirety. Exemplary audio processing functions will be described further below.

One or more processors of the access device 110-1 (e.g., processor 138, graphics engine 140, and audio processing unit 145) may generate and provide output signals (e.g., audio output signals) configured to cause the output device 112 to present the contents of the output signals for experiencing by a user. As mentioned, output signals may be provided to the output device 112 by way of the output driver 133.

5. Application Clients

One or more applications 148-151 residing within the access device 110-1 may be executed automatically or upon initiation by a user of the access device 110-1. The applications 148-151, or application clients, may reside in memory 135 or in any other area of the access device 110-1 and be executed by the processor 138.

As shown in FIG. 3, one of the applications may be a personal video recording ("PVR") application 148. A PVR application is also referred to as a digital video recording ("DVR") application. The PVR application 148 may include any application and/or device configured to record media and/or communication content and/or provide for the viewing of content in normal or trick play mode. The PVR application 148 may also provide for content recording functionality by enabling the temporary and/or permanent recording of content to the storage device 134.

In some embodiments, the PVR application 148 may be integrated into the access device 110-1, as shown in FIG. 3, or it may be a stand-alone unit. A stand-alone PVR may be coupled to the access device 110-1 or it may be used in place of the access device 110-1. In the examples contained herein, it will be assumed that the PVR application 148 is integrated into the access device 110-1 for illustrative purposes only.

a. Exemplary Audio Processing Application

The access device 110-1 may also include an audio processing application 149 configured to process audio content, including instructing the audio processing unit 145 and/or other processors of the access device 110-1 to perform any of the audio processing functions described herein and/or in the above noted co-pending U.S. patent application No. 11/603,460, entitled "Audio Filtration For Content Processing Systems and Methods."

Figure 5:
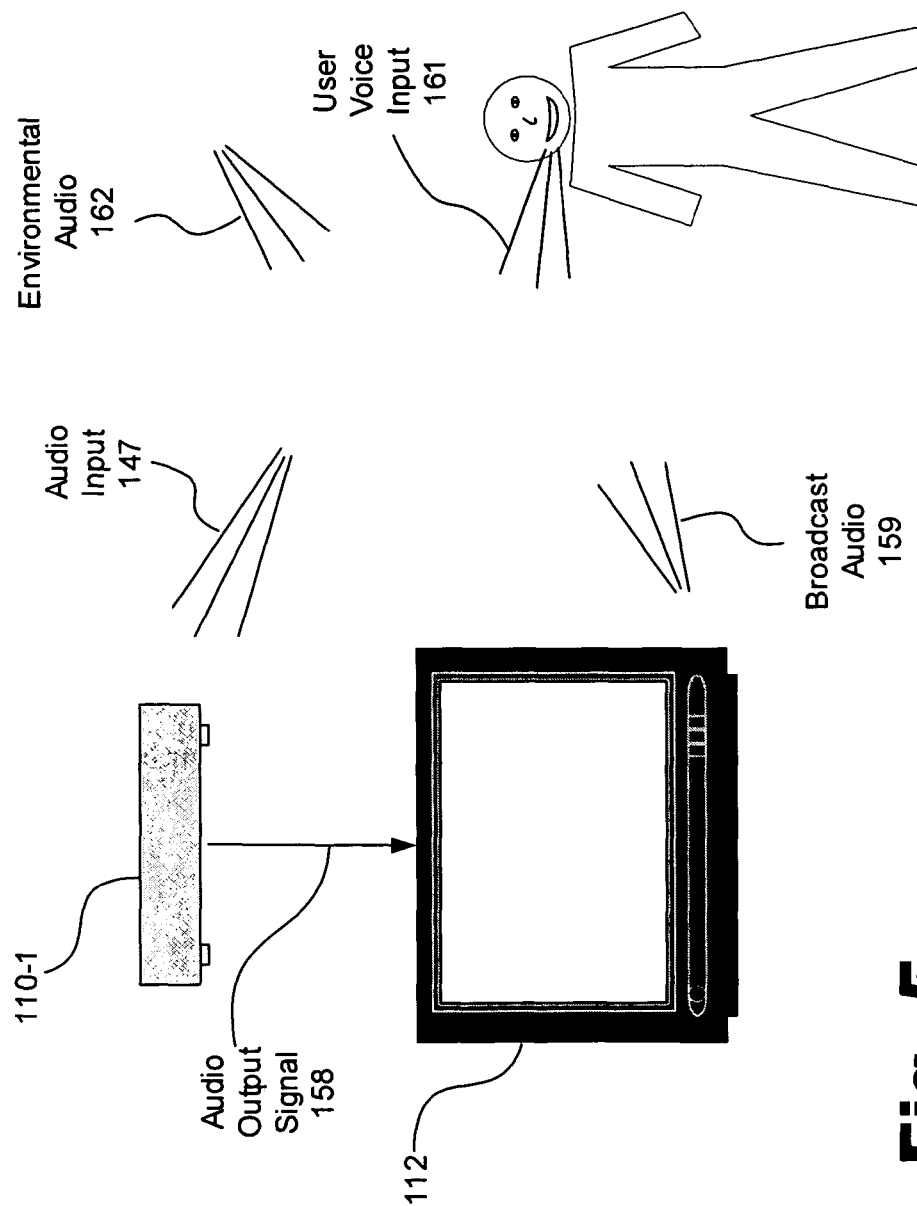
FIG. 5 illustrates an example of audio signals in an exemplary closed media network access device environment.

To facilitate an understanding of the audio processing application 149, FIG. 5 illustrates an example of audio signals in an exemplary content access environment. As shown in FIG. 5, various audio signals may be present in the environment. For example, the access device 110-1 may be configured to process an audio signal such as an audio component of a media content instance and/or a communication signal. In processing the audio signal, the audio processing unit 145 and/or the audio processing application 149 of the access device 110-1 may process any data representative of and/or associated with the audio signal, including storing such data to memory, as mentioned above. For example, in relation to providing an audio output signal to an output device 112, the audio processing unit 145 may be configured to store data representative of the audio output signal (e.g., amplitude, attenuation, phase, time, and frequency data), as well as any other data related to the audio output signal. The stored audio output data may be used in processing audio input 147 received by the audio input interface 146, as described below.

As shown in FIG. 5, the access device 110-1 may provide an audio output signal 158 to an output device 112, which may include a speaker 123 (not shown in FIG. 5), configured to broadcast audio content included in the audio output signal 158 as broadcast audio 159. Accordingly, the environment shown in FIG. 5 may include broadcast audio 159, which may include actually broadcast sound wave signals representative of an audio component of a media content instance, a communication signal, or other type of audio content being presented to the user.

As shown in FIG. 5, a user of the access device 110-1 may provide user voice input 161. Accordingly, signals (e.g., sound waves) representative of user voice input 161 may be present in the environment. In some examples, the user voice input 161 may be vocalized during broadcast of the broadcast audio 159.

As shown in FIG. 5, environmental audio 162 may also be present in the environment. The environmental audio 162 may include any audio signal other than the broadcast audio 159 and the user voice input 161, including signals produced by an environment source. The environmental audio 162 may also be referred to as background noise. At least some level of background noise may be present in a common content access environment.

Any portion and/or combination of the audio signals present in the environment may be received (e.g., captured) by the audio input interface 146 of the access device 110-1. The audio signals received by the audio input interface 146 are represented as audio input 147 in FIG. 5. The audio input 147 may include user voice input 161, broadcast audio 159, environmental audio 162, or any combination or portion thereof.

The access device 110-1 may be configured to filter the audio input 147. Filtration of the audio input 147 may be designed to enable the access device 110-1 to identify the user voice input 161 included in the audio input 147. Once identified, the user voice input 161 may be utilized by an application running on either the access device 110-1 or another device communicatively coupled to the access device 110-1. For example, identified user voice input 161 may be utilized by the voice command 150 or communication application 151.

Filtration of the audio input 147 may include removing audio output from the audio input 147. This may be performed in any suitable manner. In some cases, the access device 110-1 may simply subtract the audio output signal 158 from the audio input 147. This may be performed by generating an inverse of the audio output signal 158 and adding the inverse (e.g., an inverse waveform) to the audio input 147. However, this approach may not be sufficiently accurate or reliable in all cases. As described below, for example, the approach may not account for differences between the audio output signal 158 and the broadcast audio 159, including differences introduced by equalization settings of the output device 112.

In certain embodiments, filtration of the audio input 147 may be based on the output audio signal 158 and at least one predetermined calibration setting, which may be applied to the audio input 147 in any manner configured to remove matching data from the audio input 147, thereby isolating, or at least substantially isolating, the user voice input 161. The calibration setting and the audio output signal 158 may be used to estimate and remove the broadcast audio 159 that is included in the audio input 147.

Use of a predetermined calibration setting in a filtration of the audio input 147 generally improves the accuracy of the filtration process as compared to a filtration process that does utilize a predetermined calibration setting. The calibration setting is especially beneficial in configurations in which the access device 110-1 is unaware of differences between the audio output signal 158 and the actually broadcast audio 159 included in the audio input 147 (e.g., configurations in which the access device 110-1 and the output device 112 are separate entities). For example, a simple subtraction of the audio output signal 158 from the audio input 147 does not account for differences between the actually broadcast audio 159 and the audio output signal 158. In some cases, the simple subtraction approach may make it difficult or even impossible for the access device 110-1 to accurately identify user voice input 161 included in the audio input 147.

For example, the audio output signal 158 may include audio content signals having a range of frequencies that includes base-level frequencies. The output device 112 may include equalization settings configured to accentuate (e.g., amplify) the broadcast of base-level frequencies. Accordingly, base-level frequencies included in the audio output signal 158 may be different in the broadcast audio 159, and a simple subtraction of the audio output signal 158 from the audio input 147 would be inaccurate at least because the filtered audio input 147 would still include the accentuated portions of the base-level frequencies. The remaining portions of the base-level frequencies may evidence themselves as a low-frequency hum in the filtered audio input 147 and may jeopardize the access device 110-1 being able to accurately identify and use the user voice input 161.

Propagation delays may also affect the accuracy of the simple subtraction approach. Although small, there is typically a delay between the time that the access device 110-1 provides the audio output signal 158 to the output device 112 and the time that the associated broadcast audio 159 is received as part of the audio input 147. Although the delay is small, it may, if not accounted for, undesirably jeopardize the accuracy of the subtraction approach and limit the ability of the access device 110-1 to identify and use user voice input 161 included in the audio input 147.

Use of predetermined calibration settings in the filtration process can account for and overcome (or at least mitigate) the above-described effects caused by differences between the audio output signal 158 and the broadcast audio 159. The predetermined calibration settings may include any data representative of differences between a calibration audio output signal and calibration audio input, which differences may be determined by performing a calibration process.

The calibration process may be performed at any suitable time and/or as often as may best suit a particular implementation. In some examples, the calibration process may be performed when initiated by a user, upon launching of an application configured to utilize user voice input, periodically, upon power-up of the access device 110-1, or upon the occurrence of any other suitable predetermined event. The calibration process may be performed frequently to increase accuracy or less frequently to minimize interference with the experience of the user.

The calibration process may be performed at times when the audio processing application 149 may take over control of audio output signals without unduly interfering with the experience of the user and/or at times when background noise is normal or minimal. The calibration process may include providing instructions to the user concerning controlling background noise during performance of the calibration process. For example, the user may be instructed to eliminate or minimize background noise that is unlikely to be present during normal operation of the access device 110-1.

Figure 6:
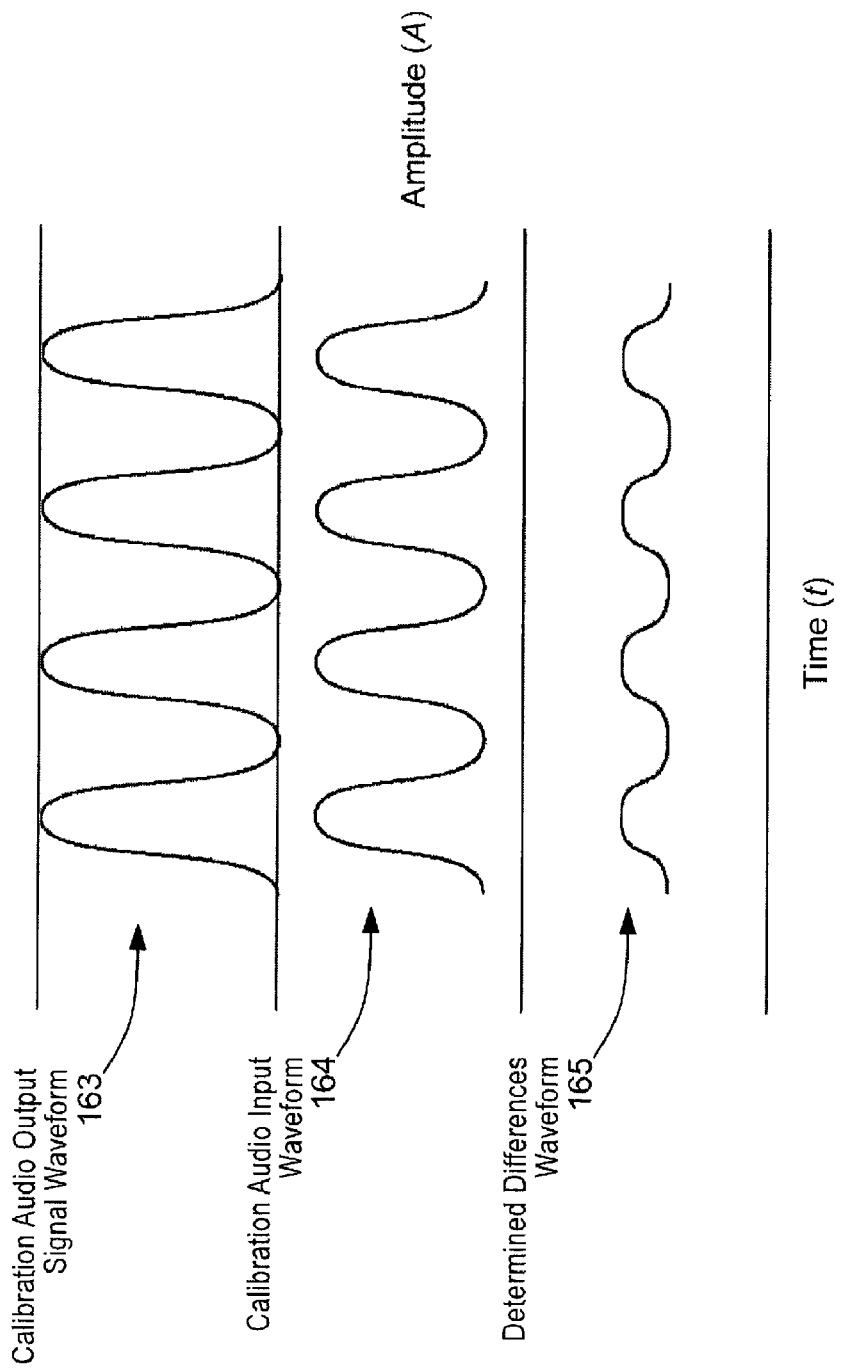
FIG. 6 illustrates exemplary waveforms associated with an audio output signal provided by the closed media network access device of FIG. 3 to an output device and broadcast by the output device.

In certain embodiments, the calibration process includes the access device 110-1 providing a predefined calibration audio output signal 158 to the output device 112 for broadcast. FIG. 6 illustrates an exemplary calibration audio output signal 158 represented as waveform 163 plotted on a graph having time (t) on the x-axis and amplitude (A) on the y-axis. The output device 112 broadcasts the calibration audio output signal 158 as calibration broadcast audio 159. The access device 110-1 receives calibration audio input 147, which includes at least a portion of the calibration broadcast audio 159 broadcast by the output device 112. The calibration audio input 147 may also include calibration environmental audio 162 that is present during the calibration process. The calibration audio input 147 is represented as waveform 164 in FIG. 6.

As part of the calibration process, the access device 110-1 may determine differences between waveform 163 and waveform 164 (i.e., differences between the calibration audio output signal 158 and the calibration audio input 147). The determination may be made using any suitable technologies, including subtracting one waveform from the other or inverting and adding one waveform to the other. Waveform 165 of FIG. 6 is a graphical representation of the determined differences in amplitude and frequency between waveform 163 and waveform 164. Such differences may be caused by equalization settings of the output device 112, as described above.

From the determined differences (e.g., from waveform 165), the access device 110-1 can determine one or more calibration settings to be used in filtering audio input 147 received after completion of the calibration process. The calibration settings may include any data representative of the determined differences between the calibration audio output signal 158 and the calibration audio input 147. Examples of data that may be included in the calibration settings include, but are not limited to, propagation delay, amplitude, attenuation, phase, time, and frequency data.

The calibration settings may be representative of equalization settings (e.g., frequency and amplitude settings) of the output device 112 that introduce differences into the calibration broadcast audio 159. The calibration settings may also account for background noise that is present during the calibration process. Accordingly, the calibration settings can improve the accuracy of identifying user voice input in situations where the same or similar background noise is also present during subsequent audio processing operations.

Figure 7:
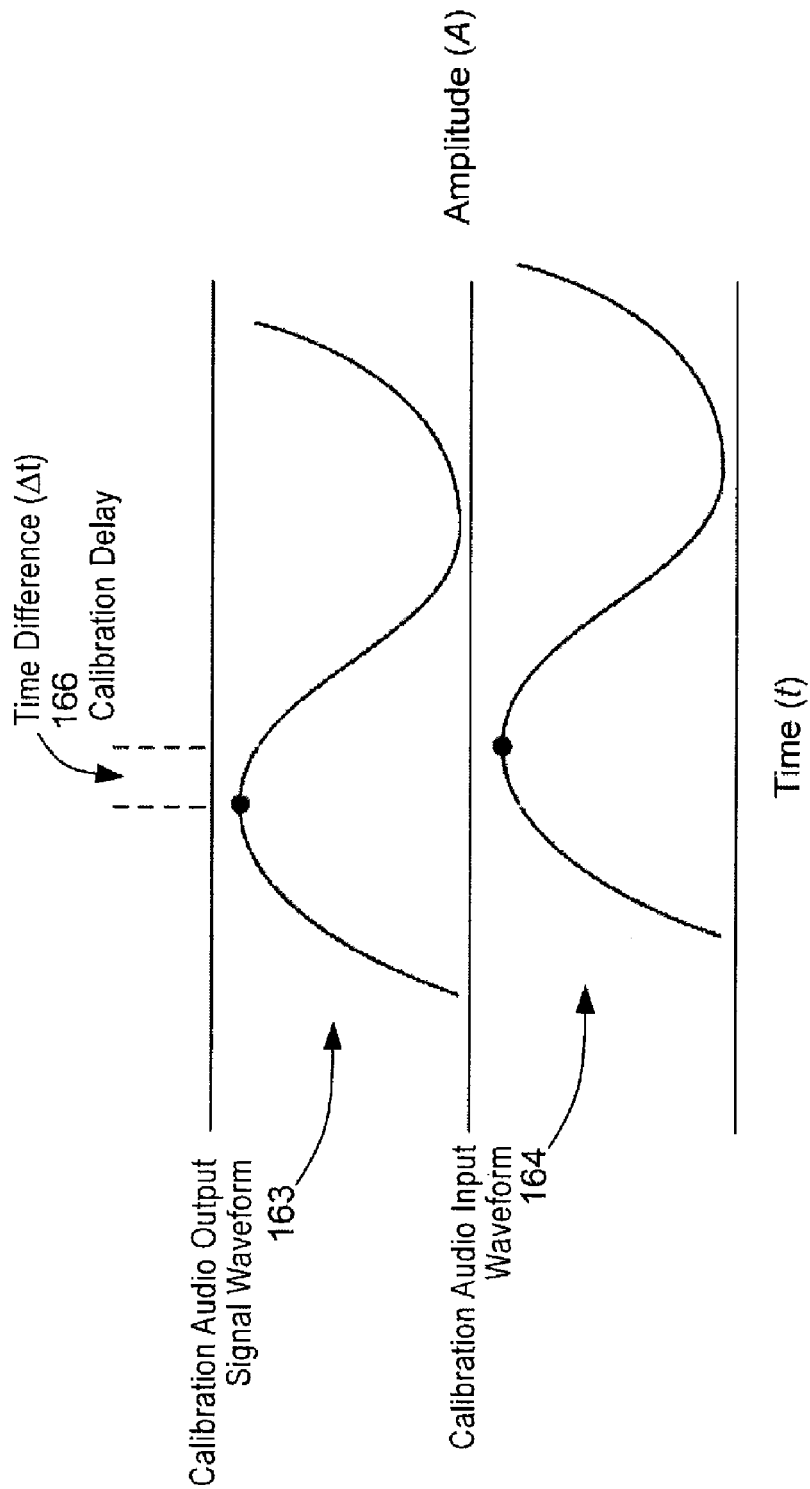
FIG. 7 illustrates exemplary waveforms associated with an audio output signal provided by and input audio received by the closed media network access device of FIG. 3.

The calibration settings may include data representative of a propagation delay between the time that the calibration audio output signal 158 is provided to the output device 112 and the time that the calibration audio input 147 is received by the access device 110-1. The access device 110-1 may determine the propagation delay from waveforms 163 and 164. This may be accomplished using any suitable technologies. In certain embodiments, the access device 110-1 may be configured to perform a peak analysis on waveform 163 and waveform 164 to approximate a delay between peaks of the waveforms 163 and 164. FIG. 7 illustrates waveform 163 and waveform 164 plotted along a common time (t) axis and having amplitude (A) on the y-axis. The access device 110-1 can determine a calibration delay 166 by determining the time difference (i.e., Δt) between a peak of waveform 163 and a corresponding peak of waveform 164. In post-calibration processing, the calibration delay 166 may serve as an estimation of the amount of time it may generally take for an audio output signal 158 provided by the access device 110-1 to propagate and be received by the access device 110-1 as part of audio input 147. The access device 110-1 may store data representative of the calibration delay and/or other calibration settings for future use.

The above-described exemplary calibration process may be performed in the same or similar environment in which the access device 110-1 will normally operate. Consequently, the calibration settings may generally provide an accurate approximation of differences between an audio output signal 158 and the corresponding broadcast audio 159 included in the audio input 147 being processed. The calibration settings may account for equalization settings that an output device 112 may apply to the audio output signal 158, as well as the time it may take the audio content included in the audio output signal 158 to be received as part of audio input 147.

Figure 8:
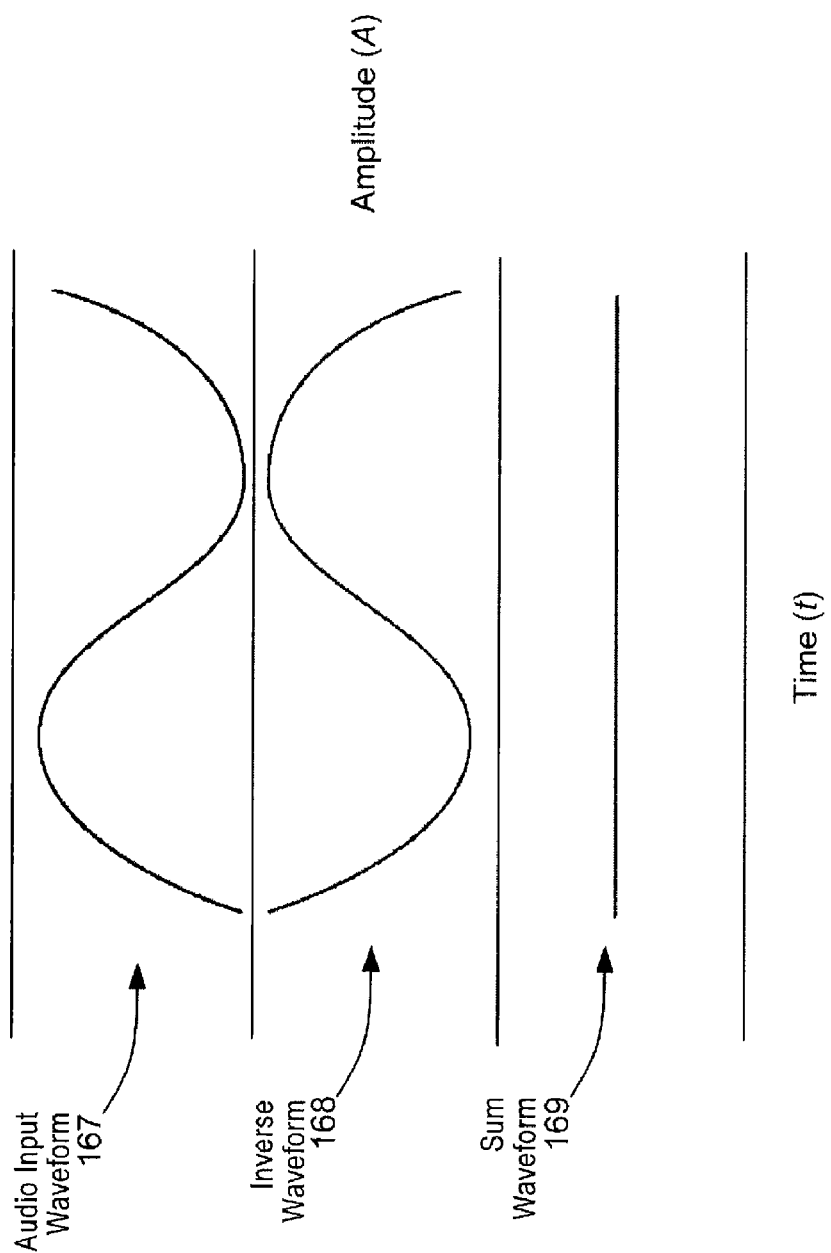
FIG. 8 illustrates an exemplary use of an inverted waveform to cancel out another waveform.

Once calibration settings have been determined, the access device 110-1 can utilize the calibration settings to filter subsequently received audio input 147. The filtration may include applying data representative of at least one calibration setting and the audio output signal 158 to the corresponding audio input 147 in any manner that acceptably filters matching data from the audio input 147. In certain embodiments, for example, data representative of the calibration setting and the audio output signal 158 may be subtracted from data representative of the audio input 147. In other embodiments, data representative of the calibration setting and the audio output signal 158 may be combined to generate a resulting waveform, which is an estimation of the broadcast audio 159. Data representative of the resulting waveform may be subtracted from or inverted and added to data representative of the audio input 147. Such applications of the calibration setting and the audio output signal 158 to the audio input 147 effectively cancel out matching data included in the audio input 147. FIG. 8 illustrates cancellation of a waveform 167 by adding the inverse waveform 168 to the waveform 167 to produce sum waveform 169. FIG. 8 illustrates waveforms 167, 168, and 169 on a graph having common time (t) on the x-axis and amplitude (A) on the y-axis.

Use of a calibration setting to filter audio input 147 may include applying a predetermined calibration delay setting. The calibration delay setting may be applied in any suitable manner that enables the access device 110-1 to match an audio output signal 158 to the corresponding audio input 147. In some examples, the access device 110-1 may be configured to time shift the audio output signal 158 (or the combination of the audio output signal 158 and other calibration settings) by the value or approximate value of the predetermined calibration delay. Alternatively, the input audio 147 may be time shifted by the negative value of the predetermined calibration delay. By applying the calibration delay setting, the corresponding output audio signal 158 and audio input 147 (i.e., the instance of audio input 147 including the broadcast audio 159 associated with output audio signal 158) can be matched up for filtering.

By applying the appropriate audio output signal 158 and calibration setting to the input audio 147, audio signals included in the input audio 147 and matching the audio output signal 158 and calibration setting are canceled out, thereby leaving other audio signals in the filtered audio input 147. The remaining audio signals may include user voice input 161. In this manner, user voice input 161 may be generally isolated from other components of the audio input 147. The access device 110-1 is then able to recognize and accurately identify the user voice input 161, which may be used as input to other applications, including voice command application 150 and/or communication application 151. Any suitable technologies for identifying user voice input may be used.

The above-described manner of applying calibration settings and processing audio input 147 may be varied in other embodiments. For example, rather than applying the calibration settings to an audio output signal 158, the access device 110-1 may be configured to apply the calibration settings to the corresponding audio input 147. In certain embodiments, the calibration settings may be subtracted from (or inverted and added to) the audio input 147, thereby removing estimated equalization effects, time delay, and/or background noise from the audio input 147. The subsequent audio output signal 158 may then be canceled from (e.g., subtracted from or inverted and added to) the audio input 147.

By filtering the audio input 147 based on at least one predetermined calibration setting and the corresponding audio output signal 158, the access device 110-1 may be said to estimate and cancel the actually broadcast audio 159 from the input audio 147. The estimation generally accounts for differences between an electronically represented audio output signal 158 and the corresponding broadcast audio 159 that is actually broadcast as sound waves and included in the audio input 147. The filtration can account for time delays, equalization settings, environmental audio 162, and any other differences detected during performance of the calibration process.

The access device 110-1 may also be configured to perform other filtering operations to remove other noise from the audio input 147. Examples of filters that may be employed include, but are not limited to, anti-aliasing, smoothing, high-pass, low-pass, band-pass, and other known filters.

Processing of the audio input 147, including filtering the audio input 147, may be performed repeatedly and continually when the audio processing application 149 is executing. For example, processing of the audio input 147 may be continuously performed on a frame-by-frame basis. The calibration delay may be used as described above to enable the correct frame of an audio output signal 158 to be removed from the corresponding frame of audio input 147.

The above-described audio processing functionality generally enables the access device 110-1 to accurately identify user voice input 161 even while the access device 110-1 provides audio content for experiencing by the user. Various applications can utilize the processed audio to provide additional features, accuracy, and controls to the user. For example, processed audio may be used by the voice command application 150 to enable a user to use voice commands to control the operations and settings of the access device 110-1, without the presentation of audio content unduly interfering with the accuracy of user voice input identifications.

b. Exemplary Voice Command Application

The voice command application 150 may be configured to receive audio input 147 that has been processed as described above. For example, the voice command application 150 may receive user voice input 161 that has been identified in audio input 147 using any of the techniques described above. The user voice input 161 may be used as input to the voice command application 150.

The voice command application 150 may utilize any suitable speech recognition applications and technologies (e.g., hidden Markov models ("HMM"), Bayesian networks neural networks, dynamic time warping, isolated word recognition, continuous speech recognition, and spontaneous speech recognition) to recognize speech included in the user voice input 161. The voice command application 150 may then determine whether recognized speech matches any predefined voice commands. If a match is found, the access device 110-1 may perform one or more actions that have been pre-associated with the corresponding predefined voice command. Such actions may include, but are in on way limited to, changing settings, launching applications, navigating menus, selecting menu options, changing media channels, and controlling presentation or recording of media content. For example, a user may say "program guide" or "show program guide," and the access device 110-1 may respond by providing a program guide graphical user interface for presentation to the user. As another example, a user may say "channel" and a number, which the access device 110-1 may recognize as a command to change the media channel to the number spoken. Many other commands and actions may be pre-associated with and performed in response to voice commands provided by a user. The examples described above are intended to be exemplary and not limiting in any sense.

The voice command application 150 may be configured to enable a user to customize voice commands. More specifically, the voice command application 150 may provide a user with functionality for associating settings and/or actions of the access device 110-1 with certain voice commands, including custom voice commands provided by the user and recorded by the access device 110-1. For example, the user may actuate a button on the user device 113 to indicate that a new voice command is to be recorded, speak the command, and then use the user device 113 to initiate one or more actions. The access device 110-1 may associate the initiated action(s) with the recorded voice command such that the voice command may be used to initiate the same action(s). User-defined voice commands and associations between voice commands and actions may be stored in a set of preferences in a storage device 134 and may be specific to a user profile associated with a user.

The voice command application 150 may provide users with a natural, intuitive, convenient, and customizable way to control the settings and operations of the access device 110-1. As mentioned previously, the control of the access device 110-1 with voice commands can be especially beneficial for visually impaired users or for users wishing to operate the access device 110-1 in a dimly lit environment. Moreover, in certain embodiments, reliance upon a user input device such as the exemplary remote control device 113 of FIG. 4 can be generally decreased by providing users with a capability to control the access device 110-1 with voice commands.

With the audio processing techniques described above, voice commands provided by a user may be accurately recognized by the access device 110 even while a media content instance (or component thereof) is being presented. Accordingly, the user is generally able to continue experiencing media content while also using voice commands to control the access device 110-1, without the presentation of the media content interfering with the user voice input 161.

c. Exemplary Communication Application

The communication application 151 may be similarly configured to receive audio input 147 that has been processed as described above, including using identified user voice input 161 as input to the communication application 151. The communication application 151 may include a videoconferencing application, a Voice over Internet Protocol (VoIP) communication service application, or any other voice communication application.

The communication application 151 may provide logic for interacting with a user, including logic for receiving and processing user input provided by a user and/or for providing communication output to a user. The input and output may collectively be referred to as communication content, which may include audio and/or video components.

The communication application 151 may be configured to send and receive communication content over the network 120, including sending communication content to and/or receiving communication content from a remotely located device such as the closed media network access devices 110-2 shown in FIG. 2, for example. The communication application 151 included in access device 110-1 may transmit outgoing communication content, including an audio component such as user voice input 161 received from a user, as well as receive and provide incoming communication content, including an audio component, for presentation to the user. Accordingly, the audio output signal 158 shown in FIG. 5 may include an audio component of communication content received by the access device 110-1 over the network 120.

The communication application 151 may be configured to utilize the audio processing functionality described herein, including filtering audio input 147 by isolating user voice input 161 as described above. The filtering may be performed as described above whether the audio output signal 158 includes an audio component of communication content, media content, or both.

In the context of the communication application 151, the audio processing described herein can generally eliminate or at least reduce echo that may be caused by an audio input device undesirably capturing audio output as part of audio input. By using audio input 147 filtered as described above as input, the communication application 151 is able to avoid transmitting unwanted noise over the network 120 along with user voice input 161.

A user may utilize the communication application 151 while concurrently experiencing media content. That is, a user does not have to pause, mute, or decrease the volume associated with the playback of media content in order to use the communication application 151 of the access device 110-1 to effectively engage in remote communications with others.

Figure 9:
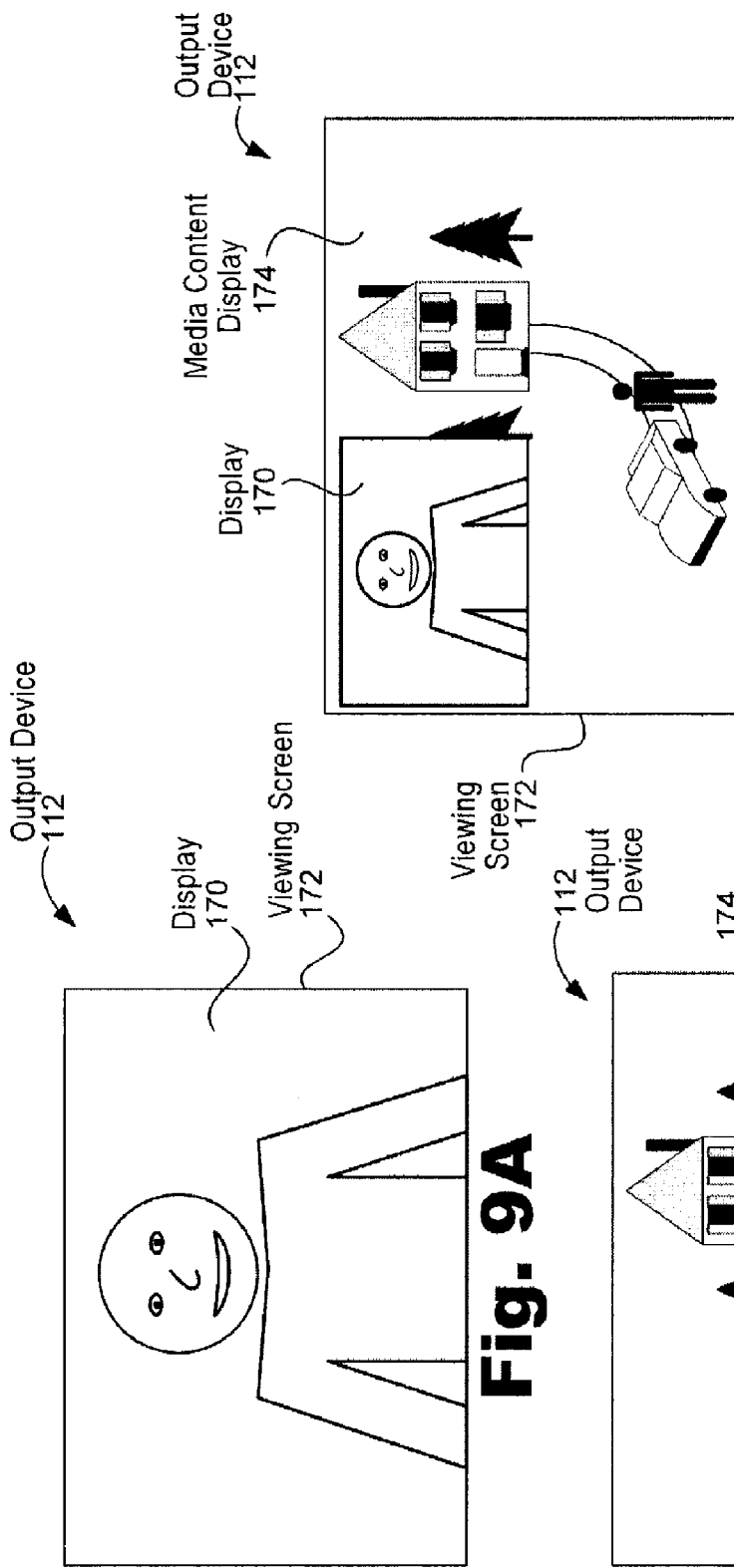
FIGS. 9A-C illustrate multiple exemplary screens views that may be provided by a communication application.

FIGS. 9A-C illustrate exemplary screen views that may be provided by the communication application 151. FIG. 9A illustrates the communication application 151 providing a videoconferencing display 170 substantially filling a viewing screen 172 of the output device 112. Along with the display 170, the access device 110-1 may be configured to provide an audio component of communication content to be presented to a user as an audio output signal 158.

FIG. 9B illustrates the communication application 151 providing both the videoconferencing display 170 and a media content display 174 within the viewing screen 172 of the output device 112. The access device 110-1 may be configured to provide both the videoconferencing display 170 and the media content display 174 for concurrent presentation such that the user may participate in remote communications while also experiencing media content. The videoconferencing display 170 may be presented in a picture-in-picture (PIP) format as shown, or in another suitable format. In the embodiment shown in FIG. 9B, the audio processing functions described herein may be utilized to filter audio input 147, where the audio output signal 158 may include an audio component of both media and communication content.

FIG. 9C illustrates the communication application 151 providing both the media content display 174 and a communication text display 176 within the viewing screen 172 of the output device 112. The access device 110-1 may be configured to convert audio communication content to text form using any suitable speech recognition and voice-to-text technologies. Accordingly, an audio component of communication content may be converted to and displayed as text for consideration by the user. Visual display of audio communication content may aid the hearing impaired in using the communication application 151 for remote voice communications. In certain embodiments, the access device 110-1 provides the user with tools for configuring the communication application 151 to cause communication content to be output in a preferred format, including, but not limited to, any of the formats shown in FIGS. 9A-C.

FIGS. 9A-C are illustrative and are not to be viewed in a restrictive sense. Many other communication interfaces and uses may be provided by the communication application 151 without departing from the principles described herein.

As mentioned, in certain embodiments the communication application 151 can enable a user to experience media content while concurrently participating in voice and/or video communications with a remotely located user. In some cases, the media content may include gaming content, and the communication application may be used in the context of the gaming content. For games involving multiple players participating as a team, for example, teammates may utilize the communication application 151 to communicate with one another while actively participating in the game. This can provide a competitive advantage to teams playing certain types of games.

In certain embodiments, a user participating in an electronic team game may be presented with a view of the game video on his main screen and a view of the main screen of a teammate in a PIP window. This may be performed by connecting (either directly or indirectly) gaming devices associated with the users to the respective closed media network device 110 such that video signals generated by the gaming devices are passed through the respective closed media network access devices 110. In each closed media network access device 110, the video signals may be used as video input to the communication application 151. Concurrently with the shared video being presented to the teammates, the teammates may utilize a voice communication connection established between them by way of the respective closed media network access devices 110.

In certain embodiments, speech recognition technologies used by the voice command application 150 or the communication application 151 may be dynamically trained. For example, as speech is recognized from user voice input 161, the access device 110-1, when in a training mode, may provide data representative of the recognized speech as output to be presented by the user. The recognized speech may be displayed by the output device 112, for instance. A user of the access device 110-1 may then be provided with tools for confirming correctly recognized speech or overriding incorrectly recognized speech. In the context of the voice command application 150, for example, an override tool may be configured to allow the user to provide the correct input command either by repeating the command vocally or by using the user input device 113 to initiate the command in a different manner. The access device 110-1 may be configured to use this user input to adapt speech recognition dictionaries and operations to train the speech recognition technologies for the speech of a particular user. The training of speech recognition technologies may be specific to a user profile. According to yet another embodiment, voice input that is ambiguous, that is recognized with a low degree of confidence, or that does not have a matching voice command, may be presented by an output device 112 with a message prompting a user for confirmation of the recognized speech or voice command.

III. Exemplary Process Views

Figure 10:
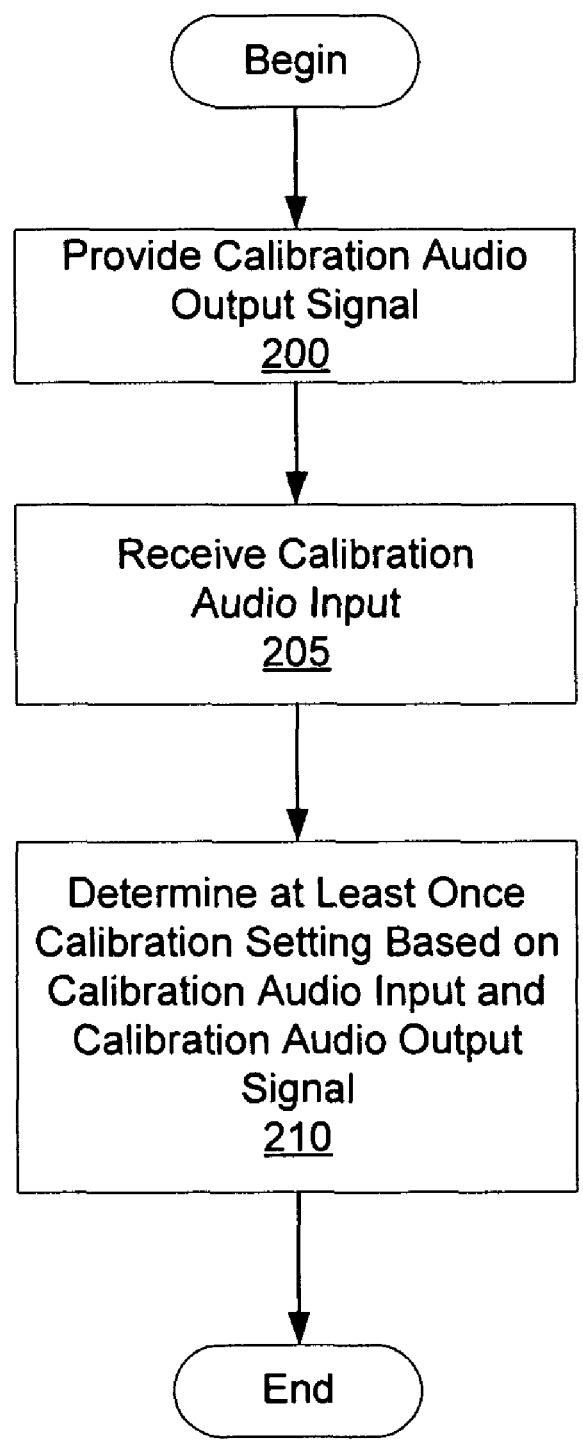
FIG. 10 illustrates an exemplary method of determining at least one calibration setting.

FIG. 10 illustrates an exemplary calibration process. While FIG. 10 illustrates exemplary steps according to one embodiment, other embodiments may omit, add to, reorder, and/or modify any of the steps shown in FIG. 10.

In step 200, a calibration audio output signal is provided. Step 220 may be performed in any of the ways described above, including the access device 110-1 providing the calibration signal to an output device 112 for presentation (e.g., broadcast).

In step 205, calibration audio input is received. Step 205 may be performed in any of the ways described above, including the audio interface 146 of the access device 110-1 receiving calibration audio input 147.

In step 210, calibration settings are determined based on the calibration audio input and output signal. Step 210 may be performed in any of the ways described above, including subtracting one waveform from another to determine differences between the calibration audio output and the calibration audio input. The differences may be used to determine calibration settings such as frequency, amplitude, and time delay. The calibration settings may be stored by the access device 110-1 and used to filter subsequently received audio input.

Figure 11:
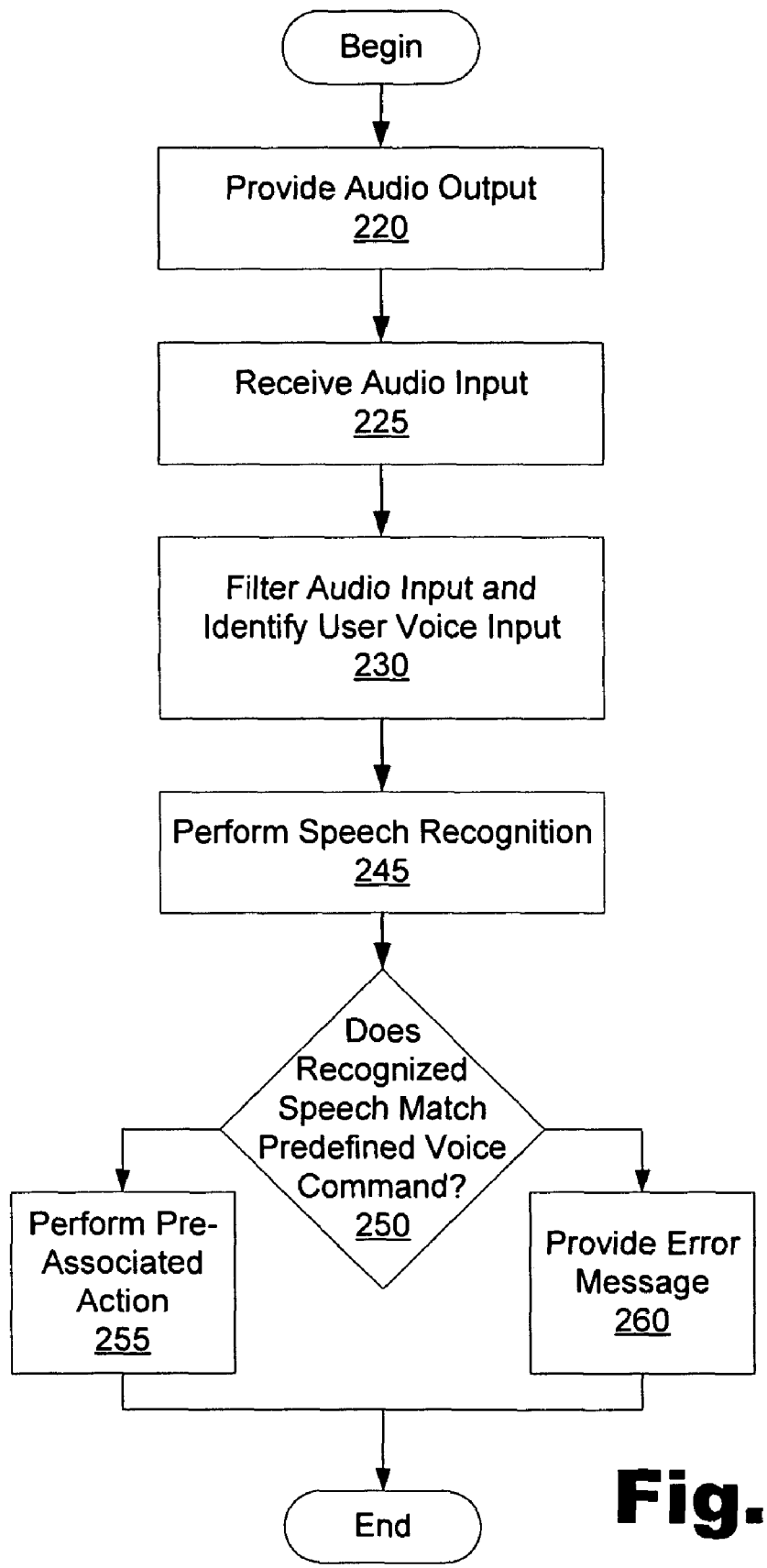
FIG. 11 illustrates an exemplary method of processing audio input.

FIG. 11 illustrates an exemplary method of processing audio content. While FIG. 11 illustrates exemplary steps according to one embodiment, other embodiments may omit, add to, reorder, and/or modify any of the steps shown in FIG. 11.

In step 220, audio output is provided. Step 220 may be performed in any of the ways described above, including access device 110-1 providing an audio output signal 158 to an output device 112 for presentation to a user. The audio output signal 158 may include any audio content processed by the access device 110-1, including, but not limited to, one or more audio components of media content and/or communication content.

In step 225, audio input is received. The audio input (e.g., audio input 147) may include user voice input (e.g., user voice input 161), at least a portion of broadcast audio output corresponding to the audio output signal 158 (e.g., broadcast audio 159), environmental audio 162, or any combination thereof.

In step 230, the audio input is filtered to identify user voice input that may be included therein. Step 230 may be performed in any of the ways described above, including the access device 110-1 using calibration settings to estimate the broadcast audio 159 and/or environmental audio 162 included in the audio input 147 and cancelling the estimated audio from the audio input 147.

Any of the steps 220-230, including step 230 in particular, may be performed subsequent to the performance of the calibration process of FIG. 10 so that calibration settings determined in the calibration process may be used in step 230, as described above.

The performance of steps 220-230 is configured to produce filtered audio input from which corresponding, estimated broadcast audio and/or environmental audio has been removed. As described above, the filtered audio input may be used in various applications configured to be executed by the access device 110-1, including the voice command 150 and communication applications 151. Steps 245-260 of FIG. 11 illustrate exemplary steps relating to the use of filtered audio in a voice command application 150.

In step 245, speech recognition is performed to recognize speech included in the filtered audio input. In step 250, it is determined whether the recognized speech matches a pre-defined voice command. If the recognized speech is determined to match a predefined voice command in step 250, processing continues at step 255. In step 255, one or more actions that have been pre-associated with the voice command are executed. On the other hand, if the recognized speech is determined not to match a predefined voice command in step 250, processing continues at step 260, at which step an error message is provided. The error message may request that the user confirm or retry a voice command, in which case processing may continue to step 225.

The exemplary method illustrated in FIG. 11, or certain steps thereof, may be repeated or performed continuously on different portions (e.g., frames) of audio content.

The process shown in FIG. 11 enables a user of the access device 110-1 to use voice commands to control the access device 110-1, including controlling the settings and/or operations of access device 110-1 in any of the ways described above. User voice input can be effectively received, identified, and matched to pre-defined voice commands even when audio output is being concurrently broadcast to the user.

Figure 12:
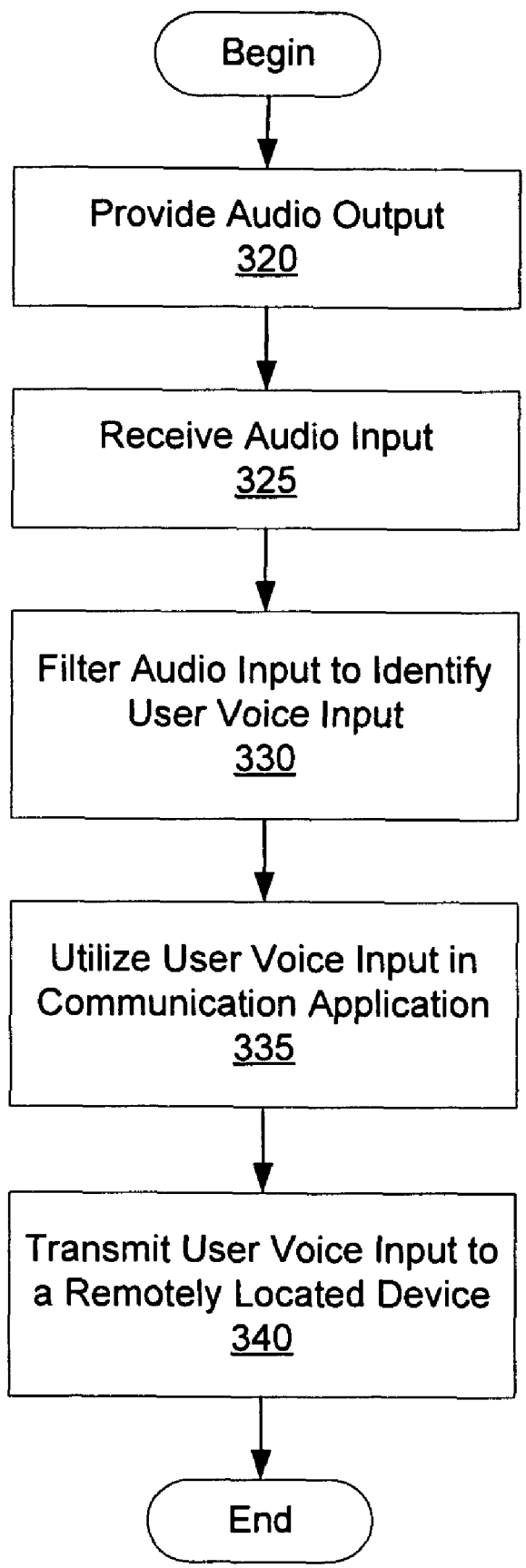
FIG. 12 illustrates another exemplary method of processing audio input.

While FIG. 11 illustrates an exemplary method of processing audio content in the context of a voice command application 150, FIG. 12 illustrates an exemplary method of processing audio content in the context of a communication application. While FIG. 12 illustrates exemplary steps according to one embodiment, other embodiments may omit, add to, reorder, and/or modify any of the steps shown in FIG. 12.

In step 320, audio output is provided. Step 320 may be performed in any of the ways described above, including access device 110-1 providing an audio output signal 158 to an output device 112 for presentation to a user. The audio output signal 158 may include any audio content processed by the access device 110-1, including, but not limited to, one or more audio components of media content and/or communication content.

In step 325, audio input is received. The audio input (e.g., audio input 147) may include user voice input (e.g., user voice input 161), at least a portion of broadcast audio output corresponding to the audio output signal 158 (e.g., broadcast audio 159), environmental audio 162, or any combination thereof.

In step 330, the audio input is filtered to identify user voice input that may be included therein. Step 330 may be performed in any of the ways described above, including any of the ways described in relation to step 230 of FIG. 11. Step 330 may be performed subsequent to the performance of the calibration process of FIG. 10 such that calibration settings determined in the calibration process may be used in step 330.

The performance of steps 320-330 is configured to produce filtered audio input from which corresponding, estimated broadcast audio and/or environmental audio has been removed. As described above, the filtered audio input may be used in communication applications 151. Steps 335-340 of FIG. 12 illustrate exemplary steps relating to the use of filtered audio by the communication applications 151.

In step 335, user voice input 161 included in the filtered audio input is utilized by the communication application 151 (e.g., as input to the communication application 151). The access device 110-1 may be configured to process the user voice input 161, including putting it into a format suitable for transmission to a remotely located device.

In step 340, the user voice input is transmitted to a remotely located device such as closed media network access device 110-2. In this manner, the user voice input 161 may be included in communications between access device 110-1 and access device 110-2.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:
1. A system comprising:
a media content provider subsystem providing media content over a closed media network;

a closed media network access device communicatively coupled to said media content provider subsystem by the closed media network, said closed media network access device configured to
  receive the media content over the closed media network,
  provide at least a component of the media content including an audio output signal to an output device for presentation to a user, the output device applying at least one equalization setting to the audio output signal set by the user of the output device,
  receive audio input including user voice input provided to said closed media network access device directly from the user and broadcast audio provided to said closed media network access device directly from the output device, and
  utilize the user voice input in at least one of a voice command application and a communication application; and
wherein the at least a component of the media content includes an audio component based on the audio output signal, and the audio input includes at least a portion of the audio component as broadcast by the output device, said closed media network access device being configured to estimate and remove the at least a portion of the audio component as broadcast by the output device from the audio input by filtering the audio input to remove the audio output signal, the filtering accounting for the at least one equalization setting applied to the audio output signal by applying an inverse of the least one equalization setting to the audio input.

2. The system of claim 1, wherein said closed media network access device includes at least one of a set-top box ("STB"), home communication terminal ("HCT"), digital home communication terminal ("DHCT"), stand-alone personal video recorder ("PVR"), and digital video disc ("DVD") player.

3. The system of claim 1, wherein the closed media network includes a provider-specific television network.

4. The system of claim 1, wherein said closed media network access device is configured to
  perform speech recognition on the user voice input,
  determine whether the recognized speech matches a predefined voice command, and
  perform an action pre-associated with the predefined voice command when it is determined that the recognized speech matches the predefined voice command.

5. The system of claim 4, wherein the action includes controlling at least one of a setting and an operation of said closed media network access device.

6. The system of claim 4, wherein the action includes controlling the presentation of the media content.

7. The system of claim 1, wherein said closed media network access device is communicatively coupled to a communication network, said closed media network access device being configured to process and transmit the user voice input over the communication network to a remotely located device.

8. The system of claim 7, wherein said closed media network access device is configured to receive communication content over the communication network and provide at least a component of the communication content to the output device for presentation to the user.

9. The system of claim 1, wherein said communication application includes at least one of a videoconferencing application and a voice communication application.

10. The system of claim 1, wherein the audio input includes environmental audio, said closed media network access device being configured to estimate and remove the estimated environmental audio from the audio input.

11. The system of claim 1, further comprising a user input device configured to communicate with said closed media network access device, said user input device being configured to capture the audio input provided by the user and provide the captured audio input to said closed media network access device.

12. An apparatus comprising:
  at least one processor configured to process media content;
  an output driver configured to provide at least a component of the media content including an audio output signal to an output device for presentation to a user, the output device applying at least one equalization setting to the audio output signal set by the user of the output device;
  an audio input interface configured to receive audio input including user voice input provided to said audio input interface directly from the user and broadcast audio provided to said audio input interface directly from the output device; and
  at least one of a voice command application and a communication application configured to be executed by said at least one processor, said at least one of said voice command application and said communication application being configured to utilize the user voice input, and
  wherein the at least one processor is further configured to filter the audio input to remove the audio output signal including at least a portion of the broadcast audio to isolate the user voice input, the filtering accounting for the at least one equalization setting applied to the audio output signal by applying an inverse of the least one equalization setting to the audio input.

13. The apparatus of claim 12, further comprising a communication interface configured to receive the media content from a content provider over a provider-specific television network.

14. The apparatus of claim 12, wherein said at least one processor is configured to
  perform speech recognition on the user voice input,
  determine whether the recognized speech matches a predefined voice command, and
  perform an action pre-associated with the predefined voice command when it is determined that the recognized speech matches the predefined voice command.

15. The apparatus of claim 14, wherein the action includes controlling the presentation of the media content.

16. The apparatus of claim 12, wherein said communication interface is communicatively coupled to a communication network, said communication interface being configured to transmit the user voice input over the communication network to a remotely located device.

17. The apparatus of claim 16, wherein said communication interface is configured to receive communication content over the communication network, said at least one processor being configured to process the communication content, said output driver being configured to provide at least a component of the communication content to the output device for presentation to the user.

18. The apparatus of claim 12, wherein said communication application includes at least one of a videoconferencing application and a voice communication application.

19. A method comprising:
  a closed media network access device providing at least a component of media content including an audio output signal to an output device for presentation to a user, the output device applying at least one equalization setting to the audio output signal set by the user of the output device;

the closed media network access device receiving audio input, said audio input including user voice input provided directly to the closed media network access device from the user and broadcast audio provided directly to the closed media network access device from the output device;

the closed media network access device utilizing the user voice input as input to at least one of a voice command application and a communication application; and the closed media network access device filtering the audio input to remove the audio output signal including at least a portion of the broadcast audio to isolate the user voice input, the filtering accounting for the at least one equalization setting applied to the audio output signal by applying an inverse of the least one equalization setting to the audio input.

20. The method of claim 19, further comprising the closed media network access device receiving the media content from a content provider over a provider-specific television network.

21. The method of claim 19, further comprising the closed media network access device:

performing speech recognition on the user voice input;

determining whether the recognized speech matches a predefined voice command; and performing an action pre-associated with the predefined voice command when it is determined that the recognized speech matches the predefined voice command.

22. The method claim 21, wherein said performing the action includes controlling the presentation of the media content.

23. The method of claim 19, further comprising:

transmitting the user voice input over a communication network to a remotely located device;

receiving communication content over the communication network; and providing at least a component of the communication content to the output device for presentation to the user.

24. The system of claim 1, wherein the closed media network access device is further configured to determine differences between a calibration output signal and a calibration audio input to estimate the at least a portion of the audio component as broadcast by the output device.

25. The system of claim 1, wherein the closed media network access device is configured to determine a propagation delay between the audio output signal and the at least a portion of the audio component as broadcast by the output device, and wherein filtering the audio output signal includes compensating for the propagation delay.

26. The system of claim 1, wherein the closed media network access device is configured to respond to custom voice commands.

27. The system of claim 1, wherein the closed media network access device is configured to convert the user voice input into text for display on the output device.

* * * * *